Nov. 10, 1964 H. M. BECK 3,156,904

PASSIVE TRANSISTOR-MAGNETIC CORE SWITCHING SYSTEM

Filed Sept. 30, 1960

INVENTOR
HUGO M. BECK

BY John E. Kidd AGENT

Richard Reed ATTORNEY

United States Patent Office 3,156,904
Patented Nov. 10, 1964

3,156,904
PASSIVE TRANSISTOR-MAGNETIC CORE SWITCHING SYSTEM

Hugo M. Beck, Oxon Hill, Md., assignor to the United States of America as represented by the Secretary of the Navy Filed Sept. 30, 1960, Ser. No. 60,274
2 Claims. (Cl. 340—174)
(Granted under Title 35, U.S. Code (1952), sec. 266)

The invention described herein may be manufactured and used by or for the Government of the United States of America for governmental purposes without the payment of any royalties thereon or therefor.

The present invention relates generally to the computer and communications field and more specifically to a two core per bit shifting circuit for use in versatile shift registers, commutators and other electronic devices demanding complex logic.

Most magnetic core systems of circuit logic are based on the concept of shifting binary digits from one core to another. This invention is concerned with the logical functions that are performed during the shifting operations.

In the prior art, cores are generally interconnected by two diodes and a resistor, to accomplish a unidirectional information transfer. This method requires a large driving power in order to compensate for the excessive amount of power that is dissipated when information attempts to travel in a direction the reverse of the desired direction of information flow. In this system the power is dissipated in essentially an open circuit, thereby causing only a slight loss of power.

Also in conventional core circuits, the information cannot be simply gated in or out, or directed to one of several cores. A single core cannot easily receive information in a single winding from several other similar cores without serious interaction. In prior systems where multiple aperture plates are required, special ferrite devices must be built, in contrast to the simple toroid used throughout the present invention.

Shifting devices incorporating transistors in the transfer network have also been devised; however, these have been limited by requiring active transistor circuits using a directly coupled power supply as a transfer element, and a temporary storage element in the transfer network is generally needed. Examples of such circuits are found in Patents 2,747,110 to Jones and 2,866,178 to Lo et al.

The present invention is based on the use of magnetic elements having substantially rectangular hysteresis loops which are stable in two states and a passive transistor coupling network. In one state, the magnetic elements may be said to express the binary 1, and in the other state it may be said to express the binary 0. These elements, such as ferrite and-or tape wound cores, have the advantages of small size, relatively long life, a relatively small power supply, and the necessity for exact timing of the drive pulses, as is generally necessary with tubes or transistors, is alleviated. The invention utilizes magnetic switching elements and passive transistors, in the process of storing and acting upon information in binary form, to combine, control and modify binary information according to the rules of logic. All sixteen logical combinations of two variables, as well as functions of three or more variables, are possible with the present system, any one of them being accomplished in a single clock time.

Therefore, it is an object of the present invention to provide an improved high-speed shift register that will operate with a minimum of electrical energy.

Another object is to improve the reliability and versatility of present storage devices without undue complexity.

It is a further object of the invention to provide a passive transistor transfer network for a two core per bit shifting circuit.

It is still a further object of this invention to provide expeditious controlled gating between bistable magnetic cores for multiple core per bit shifting circuits.

Other objects and many of the attendant advantages of this invention will be readily appreciated as the same becomes better understood by reference to the following detailed description when considered in connection with the accompanying drawings wherein.

Figure 3:
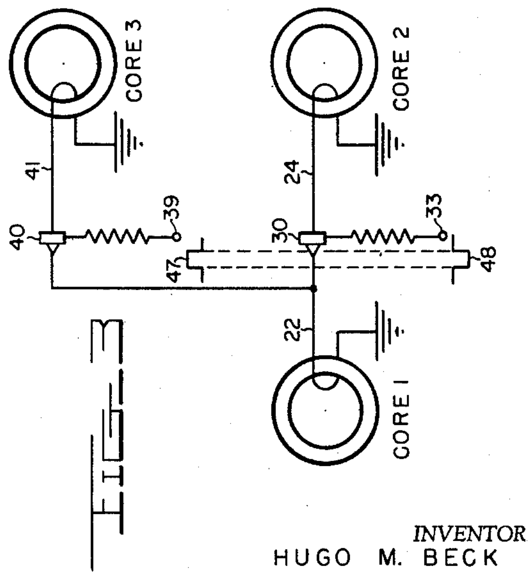

FIG. 3 illustrates this invention as a transfer switch to control output of core 1 into either core 2 or core 3.

Figure 4:
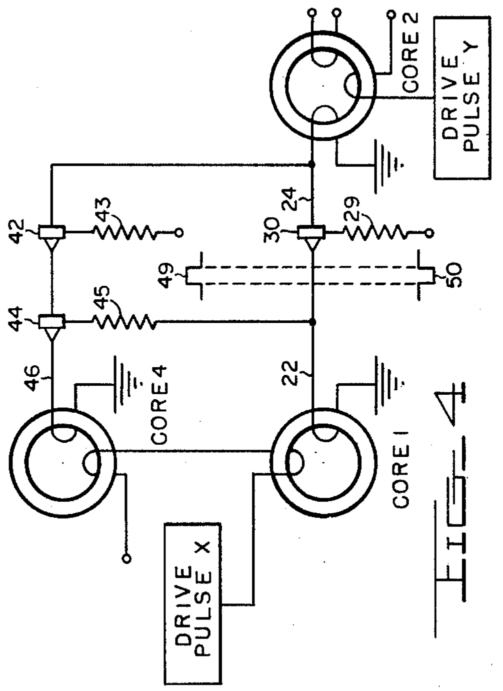

FIG. 4 is an example of an "exclusive OR" circuit wherein a core can accept an input from one or more cores.

Figure 1:
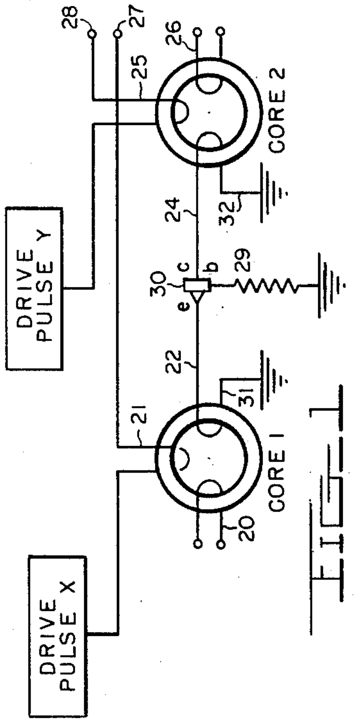
FIG. 1 shows a two core per bit shift register of a preferred embodiment of the invention.

Referring now to the drawings, the basic format of the system is shown as a shift register in FIG. 1. Core 1 and core 2 are made of a magnetic material with a substantially rectangular hysteresis loop, each core being capable of having two stable, reproducible states. Once magnetized to one of these states by an applied field strength of amplitude $H_M$ or $-H_M$, the cores will remain there indefinitely without the application of external power. Depending upon which of these two field strengths is applied, determines whether the cores have a binary number "1" or "0" stored in it. A shift register is a device made up of any number of these magnetic cores, so interconnected that binary numbers, represented by a magnetized core, can be stored and transferred from one core to another.

Referring again to FIG. 1, each core has three windings: an input winding 20, an output winding 22, and an advance winding 21. The advance drive pulses are represented by drive pulse X and drive pulse Y. The advance drivers may be of any conventional design, such as a receiver tube type pentode or a transistor type pulse source. When activated, the drive pulse X causes a magnetizing current to flow through the serially connected advance windings of the odd numbered cores by means of line 27. The drive pulse Y is similarly connected to the even numbered cores by means of line 28. The output winding 22 of core 1 is connected to emitter *e* of transistor 30 and the collector *c* is connected to input winding 24 of core 2.

The base *b* of transistor 30 is connected to ground through an impedance device, such as resistor 29. The other end 31 of the output winding of core 1 is connected to ground, as is the other end 32 of input winding of core 2, although an impedance may also be inserted between ground and windings. A positive pulse on output winding 22 will then set core 2 by way of the collector electron current flowing in the input winding 24 of core 2.

In the description of the operation of the magnetic shift register that follows, it is assumed that the two cores of FIGURE 1 are in the "0" state initially. An unbiased transistor 30 replaces the two diodes in the conventional coupling network in two core per bit shift registers. Since 30 is unbiased, no additional D.-C. power supply is necessary. At time $T_1$, the input winding and advance drive pulse Y, are pulsed. The input pulse causes core 1 to change to positive saturation flux density and to binary state "1." When core 1 is switched by an input pulse, the emitter junction of transistor 30 is back-biased and core 1 is decoupled from core 2, causing core 2 to remain at "0." At time $T_2$, the drive pulse X is pulsed and core 1 is returned to negative saturation flux density. The large change in flux in going from "1" to a negative saturation flux density, produces a positive voltage signal at the output winding 22 which in turn causes a current to flow in the forward direction of transistor 30. The current causes transistor 30 to conduct, sending collector electron current into input winding 24 of core 2, magnetizing it to positive saturation flux density and transferring the binary number "1" to core 2. Resistor 29 controls the magnitude of the current in winding 24. Core 2 can then be set by drive pulse Y and the process repeated, transferring binary number "1" to the next succeeding core. When core 2 is switched, a back bias appears on the collector junction of transistor 30, thereby decoupling core 2 from core 1. The decoupling action by transistor 30 increases the efficiency of switching since the ampere-turns in the input winding of core 2 is practically zero during the forward switching process caused by the shift pulse. Here a PNP transistor is shown; however the system will work equally well with either PNP or NPN transistors by appropriate arrangements of the core windings.

The magnetic shift register shown in FIGURE 1 is a series storage device. That is to say, the bits of a number are read in one at a time, and read out one at a time. It can be connected to store coded decimal numbers as well as binary numbers. It is also contemplated that applicant's invention can be used to modify binary information according to the rules of logic in a magnetic matrix storage device.

Figure 2:
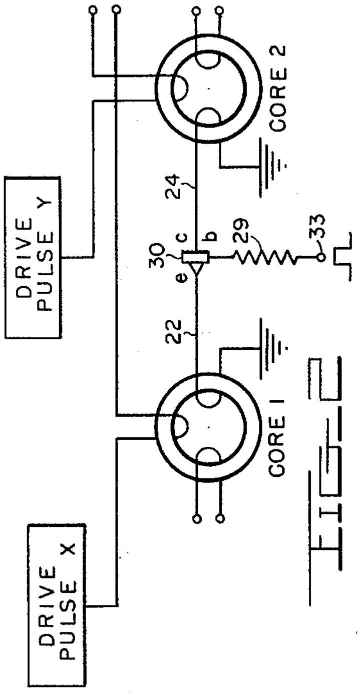
FIG. 2 illustrates this invention used as a switch to control output of core 1 into core 2.

In the circuit arrangement of FIG. 2, it will be noted that resistor 29 is connected to bias point 33. By returning the transistor base to a bias point, the transfer of information from core 1 to core 2 can be inhibited and a complete set of logical switching circuits can be implemented, making possible a wide variety and complexity of logic. Large effective fanouts are obtained by controlling many transistor bases by a single bias point, the advantage being that base current only is controlled, and not the complete switching current.

FIGURE 3 shows how the principles of this invention can be used as a transfer switch to gate the output of core 1 to core 2 or to core 3, but not to both. Pulse 47 and pulse 48 are complementary pedestal control signals applied to bias points 39 and 33, respectively, providing a circuit capable of transferring, current steering or branching the binary number "1" to one of two or more cores by proper pedestal control selection. While FIGURE 3 only shows core 1 transferring a binary value to two possible cores, it is to be understood that the number of cores to which core 1 can transfer a binary value are only limited by the number of cores that are practical for the end result desired, and that core 1 can be used to set more than one receiving core. The receiving cores may be connected either in parallel or series.

In the circuit shown in FIG. 2, it was mentioned that by applying the base resistor 29 to bias point 33, a complete set of logical switching circuits can be implemented. For example, FIG. 4, assuming for the moment that output winding 46 is connected directly to transistor 42, shows how a core can accept an input from one or more cores, depending on the bias levels on the bases of the transistors 42 and 30, thus very simply instrumenting more complicated structures. Large effective fan-ins can thereby be obtained by combining similarly more core outputs to a single input winding. By connecting the collectors of transistors fed from two different cores to the input of a third, the "inclusive OR" circuit is obtained. All sixteen two-valued switching functions, as well as multiple-valve switching functions can be similarly constructed. Reversible shift registers would cost two cores, three transistors and three resistors per bit.

Considering now FIG. 4, as shown, an "exclusive OR" circuit utilizing a constant ones generator is obtained. Using core 4, in FIG. 4, as a constant ones generator, if at the same time core 1 generates an output pulse, transistor 44 will be gated to cut off, so that the pulse from constant ones generator, core 4 is inhibited. If now pedestal pulse 50 is such that transistor 30 is also cut off, no pulse will arrive at core 2. If pedestal pulse 50 is such that 30 is on, then a pulse will arrive at core 2.

Now if at core 1 there is no pulse being generated, 44 is not inhibited and the core 4 output will pass through 44 and applied to the emitter of 42. If transistor 42 is gated off by pedestal pulse 49, no pulse will arrive at core 2, but if transistor 42 is gated on, a pulse originating from core 4 passes through transistors 42 and 44 arriving at input winding 24 of core 2. This accomplishes the "exclusive OR" function in one clock time.

Applicant's invention is directly applicable for use with present magnetic toroids, as well as proposed new ferrite and thin film magnetic core devices for rapid speed operation and while only one turn windings have been shown with the cores, it should be kept in mind that the windings may be multiple. The present invention will also be applicable to any future system utilizing deposited cores and deposited transistors, for example, on a plane sheet of insulating material, with deposited or printed wiring or applicable as a section of a full adder circuit.

Obviously many modifications and variations occur to a hybrid switching system of the present invention in light of the above teachings. It is, therefore, to be understood that within the scope of the appended claims, the invention may be practiced otherwise than as specifically described.

What is claimed is:

1. A two core per bit shifting circuit for transferring information with a minimum of energy consumption comprising:

first and second bistable cores of a magnetic material having a substantially rectangular hysteresis loop, each of said cores having an input winding, an output winding and an advance winding;

first and second pulse drive means connected to the advance windings of said first and second cores to produce a first stable magnetic state in said first and second cores;

said first and second pulse drive means being controlled to alternately energize the advance windings of said first and second cores and said second pulse drive means being further controlled to energize the advance winding of said second core substantially simultaneously with the energization of the input winding of said first core;

said input winding for said first and second cores being connected and energized to produce a second stable magnetic state in said first and second cores;

a passive transistor having emitter, base and collector leads;

circuit means connecting said transistor base lead to ground, said transistor collector lead to the input winding of said second core, said transistor emitter lead to the output winding of said first core so that said transistor will conduct when said first core is changed from the second to the first of said stable magnetic states and said circuit means further connecting the other ends of said first core output winding and said second core input winding to ground;

whereby said transistor decouples said first and second cores when said first core is changed from the first to the second of said stable states.

2. A register shift circuit for transferring information with a minimum of energy consumption comprising:

first and second cores, each core having an input winding, an output winding and an advance winding;

drive means to alternately energize the advance windings of said first and second coils in ordered sequence and in predetermined time relationship with the signals received in the input winding of said first core;

a passive transistor having emitter, base and collector leads;

circuit means connecting said transistor base lead to ground, said transistor emitter lead to the output winding of said first core and said transistor collector lead to the input winding of said second core;

whereby said transistor decouples said first and second cores when the advance winding of said second coil is energized by said drive means.

References Cited in the file of this patent

UNITED STATES PATENTS

| | | |
|---|---|---|
| 2,644,893 | Gehman | July 7, 1953 |
| 2,968,796 | Lane et al. | Jan. 17, 1961 |
| 3,027,545 | Kodis | Mar. 27, 1962 |
| 3,059,225 | Perry et al. | Oct. 16, 1962 |